United States Patent
Gabriel (10) Patent No.: US 11,491,834 B1
(45) Date of Patent: Nov. 8, 2022

(54) CONTROLLED-FLEXING TRAILER HITCH SYSTEM AND METHOD

(71) Applicant: Gameel Gabriel, Covington, LA (US)

(72) Inventor: Gameel Gabriel, Covington, LA (US)

( * ) Notice: Subject to any disclaimer, the term of this patent is extended or adjusted under 35 U.S.C. 154(b) by 0 days.

(21) Appl. No.: 17/134,576

(22) Filed: Dec. 28, 2020

Related U.S. Application Data (63) Continuation-in-part of application No. 15/939,215, filed on Mar. 28, 2018, now Pat. No. 10,875,369.

(51) Int. Cl.
- *B60D 1/40* (2006.01)
- *B60D 1/167* (2006.01)
- *B60D 1/18* (2006.01)

(52) U.S. Cl.
CPC ............. *B60D 1/40* (2013.01); *B60D 1/1675* (2013.01); *B60D 1/187* (2013.01)

(58) Field of Classification Search
CPC ....................................................... B60D 1/40
See application file for complete search history.

(56) References Cited

U.S. PATENT DOCUMENTS

| | | | | |
|---|---|---|---|---|
| 3,891,237 A * | 6/1975 | Allen | ....................... | B60D 1/00 280/477 |
| 3,989,270 A * | 11/1976 | Henderson | ............... | B60D 1/40 280/479.3 |
| 4,042,254 A * | 8/1977 | Allen | ....................... | B60D 1/38 280/479.3 |
| 4,125,272 A * | 11/1978 | Putnam, Jr. | .............. | B60D 1/40 280/479.3 |
| 4,991,865 A * | 2/1991 | Francisco | .............. | B60D 1/155 280/477 |
| 5,011,176 A * | 4/1991 | Eppinette | ............... | B60D 1/155 280/479.3 |
| 5,277,447 A * | 1/1994 | Blaser | ...................... | B60D 1/40 280/478.1 |
| 6,428,030 B2 * | 8/2002 | Melesko | ................ | B60D 1/363 280/477 |
| 7,556,279 B2 * | 7/2009 | Suhling | .................... | B60D 1/06 280/511 |
| 8,201,843 B2 * | 6/2012 | Neu | ........................ | B66D 3/006 280/479.3 |
| 2012/0200065 A1 * | 8/2012 | Cruz | ........................ | B60D 1/06 280/511 |
| 2015/0191063 A1 * | 7/2015 | Fincher | .................. | B66D 3/006 280/479.3 |

* cited by examiner

*Primary Examiner* — Kevin Hurley
(74) *Attorney, Agent, or Firm* — Kenneth L. Tolar

(57) ABSTRACT

A controlled-flexing trailer hitch system and method to facilitate vehicle-to-trailer attachment and maneuvering by providing a flexible state during attachment, detachment, and low-speed maneuvering of a trailer, and automatic change to a fixed in-line state upon the in-line pulling of the trailer, by providing disengageable spring-return stiffening members and a flexible segmented towing member, where the spring-return stiffening members can be disengaged to allow flexible movement of the flexible towing member, and where, upon commencement of the in-line pulling of the trailer, the spring-return stiffening members engage to place the controlled-flexing trailer hitch into a fixed in-line state.

7 Claims, 4 Drawing Sheets

CONTROLLED-FLEXING TRAILER HITCH SYSTEM AND METHOD

CROSS REFERENCE TO RELATED APPLICATIONS

This application is a continuation-in-part of application Ser. No. 15/939,215 filed on Mar. 28, 2018.

BACKGROUND

This invention provides a controlled-flexing trailer hitch system and method.

Vehicles can be equipped to tow trailers. A "trailer hitch" component, usually a ball, is rigidly mounted to the vehicle, ultimately to the vehicle's frame. Another "trailer hitch" component, usually a cup or receiver, is rigidly mounted to the trailer's frame. The coupling or attachment of the vehicle and the trailer is rigid, as is necessary at operating speed and conditions. A flexible connection would allow the trailer to run into the vehicle when slowing down or stopping and would present other problems. However, the rigidity of the vehicle-trailer coupling presents problems during the coupling and uncoupling process, and during low-speed maneuvering associated with coupling and uncoupling.

In order to properly couple the trailer to the vehicle, a user must perfectly align the ball with the cup, which typically requires multiple attempts. Often, an assistant must stand near the trailer hitch and guide the driver who repeatedly reverses and advances the vehicle until proper alignment is achieved. Furthermore, the hitch components must be constructed with a rigid, inflexible material, which makes alignment more difficult. If the components were constructed with a flexible material, such as rope or chain, to facilitate the coupling process, the coupling would be useless since the trailer would plow into the towing vehicle when the vehicle decelerates or stops. Likewise, if the vehicle is reversed, it will collide with the trailer. The present invention overcomes this problem by providing a trailer hitch that can flex during the coupling process thus eliminating the need for perfect alignment but becomes rigid when the vehicle is driven forward.

The prior art does not provide for a controlled-flexing trailer hitch system and method of the present invention for providing controlled flexibility of the vehicle-to-trailer coupling during coupling, uncoupling, and low-speed maneuvering, with automatic changeover to a rigid coupling at the earliest appropriate time and without any action required from the operator of the vehicle For example, U.S. Publication No. 2012/0200065 was published by John Charles Cruz on Aug. 9, 2012, disclosing an "Electric Controlled Trailer Hitch and Link Assembly Alignment Device." The electric controlled trailer hitch was designed to be a new approach to connecting to a boat, trailer, and so forth with only using one person. The hitch-and-link assembly enables one person to back up a vehicle to a boat, trailer, or similar vehicle, and with a switch, activate the moveable chain. The chain can sway from right to left, and the electric motor works the chain backwards and forwards in order to align with the tongue of the boat or trailer. Accordingly, the traditional method of needing another person to navigate, or one person having to keep backing up or moving from right to left in order to align the apparatus, is no longer necessary.

U.S. Pat. No. 4,991,865, issued to Thomas E. Francisco on Feb. 12, 1991, covers an "Automatic Self-Aligning Trailer Hitch." The patent discloses an automatic trailer hitch for use with a draft vehicle. The hitch contains devices for attaching its two ends to a trailer and to a vehicle for towing the trailer. When the hitch is being connected to the vehicles, it may be extended in length; the presence of at least two telescoping members in the hitch allows such extension. Once the hitch has been connected to the vehicles, the towing vehicle may be backed towards the draft vehicle, thereby contracting the length of the hitch. A locking mechanism, comprised of a spring-loaded pawl, locks the hitch into its contracted position once it has reached a certain specified minimum length. Any means for retracting the hitch and automatically locking the hitch once it reaches its retracted position may be used. In one embodiment, the latching mechanism may be comprised of a latching pawl, which pivots about a pin that is inserted in a latching pawl mount. Spring biases the rotation of the latching pawl in a direction causing it to move through the clearance hole in the outer member, clearance hole in the intermediate member, and into a latching pawl receiving slot in the inner member when the hitch is in the appropriate retracted position. The mechanism can in turn be unlatched by applying pressure to the latching pawl in such a manner that the appropriate pawl position is attained. At that point, the telescoping members may be pulled to any extended length desired from the hitch.

U.S. Pat. No. 3,891,237 was issued on Jun. 24, 1975 to inventor Bill Allen for a "Trailer Hitch." In this hitch, an elongated member, adapted to be connected with a towed vehicle, is provided, with an axial socket coaxial with a bell-shaped flange for guiding a shank. The device is connected at one end by a ball joint to a traction vehicle, into the socket whereby a spring urged pawl engages a keeper notch formed in the shank for automatically coupling the traction vehicle to the towed vehicle.

U.S. Pat. No. 4,125,272, as issued on Nov. 14, 1978 for a "Self-Aligning Towing Hitch," was developed by inventors Cecil J. Putnam, Jr. and James E. Malone. The patent, which was assigned to Putnam Pattern & Engineering Co., covers a hitch for vehicle trailers for facilitating interconnection of the tow and towed vehicles, suitable for use with recreational vehicle trailers. The hitch includes an extensible and universally pivotable support for one of the hitch components, permitting an easily achieved interconnection between the vehicles, whereby the tow vehicle can pull the trailer to a near alignment, and the hitch members to a towable condition. The system also permits for the hitch component to be moved either horizontally or vertically for prehatching purposes, and automatic alignment of the tow and towed vehicles occurs during positioning of the hitch to its towing condition. In practice of the invention, the self-aligning hitch structure, which may be mounted upon either the tow or towed vehicle, includes a guide tube of rectangular transverse cross section rigidly mounted to its associated vehicle. A slide is slidably mounted within the guide tube having a transverse rectangular configuration corresponding to that of the tube and is movable within the tube between retracted and extended positions. An arm pivotally mounted to the slide by means of a universal joint supports one of the vehicle hitch components and, when the slide and arm are in the extended position, the universal joint permits the arm and hitch component to be universally adjusted relative to the tube to accommodate the vertical position of the other vehicle hitch component, and the ability of the arm to be positioned within the tube permits adjustment of the distance existing between the hitch components when the tow vehicle is initially positioned.

U.S. Pat. No. 7,556,279, as issued to Todd A. Suhling on Jul. 7, 2009, discloses a "Pivotal Trailer Hitch." The trailer hitch has a pivotal ball mount with upper and lower wedge-shaped parallel plates that are connected by a pivot pin to the opening of a socket. A lock lever is pivotally mounted in the mounting element and is spring biased toward locking engagement with the recesses of the pivotal ball element. By tilting the lock lever away from the pivotal ball mount, the pivotal ball mount is free to rotate so that its hitch ball can move in an arc laterally for alignment with the ball receptacle of the trailer tongue. Forward movement of the towing vehicle and trailer causes the pivotal ball mount to become aligned with the lock lever, and the spring urges the lock lever back into locking engagement with the recesses. The pivotal ball mount can be inverted so as to raise or lower the height of the hitch ball.

U.S. Pat. No. 5,277,447 was issued to James Blaser on Jan. 11, 1994, covering a "Trailer Hitch with Alignment Adapter." Here, in the trailer hitch, connecting a towing vehicle and a trailing vehicle, each "coupling" member of each vehicle has a support component and an attachment component. An adapter is interposed between and attached to the support component and the attachment component of one member. The adapter has a guide plug telescoped with the support component, and an adjustment portion coupled to the attachment component and hinged to the guide plug for lateral movement. A pair of angled faces on the adapter serve to cam the components into axial alignment as the towing vehicle and the trailing vehicle are brought closer together. The adapter is capable of both axial and lateral, swinging movement for easy vehicle attachment.

U.S. Pat. No. 5,011,176, as issued on Apr. 30, 1991 to assignee Flexi-Hitch, Inc., covers an "Adjustable Trailer Coupling." The coupling device, created by inventor Horace Eppinette, is used for connecting a towed vehicle to a towing vehicle in which the towed vehicle has a towing bar. In the system, there is a telescopic arm received within the towing bar with an end of the telescopic arm pivotally connected to an articulating arm. The other end of the articulating arm has mounted to it a trailer hitch adapted for connected to a trailer hitch ball. There is an anti-pivot collar that encircles the point where the telescopic arm and the articulating arm are pivotally connected. By selectively extending the telescopic arm and moving the anti-pivot collar to permit articulation between the pivotal and telescopic arms, the coupling device can simplify connection between a towed and towing vehicle. There is further provided locking means for securely locking the coupling device in its locked position.

U.S. Pat. No. 4,042,254 was issued to Gordon L. Allen on Aug. 16, 1977 for an "Automobile Hitch Coupler Aid." In the system, an automobile hitch coupler aid is provided for hitching together two vehicles, wherein the complementary coupling members are not easily brought into exact registration. The device comprises a female hollow pyramidal member having structure for mounting this member on one of the vehicles with a male pyramidal member having an outer surface substantially complementary to the inner surface of the female pyramidal member, adapted to move between a closely nested position in the female member and a separated position that permits movement of the male pyramidal member relative to the female pyramidal member in any direction. To manipulate the two pyramidal members, a flexible member such as a chain or cable has one end fixed to the narrower end of the male pyramidal member, and which then passes outwardly through the narrower end of the female pyramidal member, and a device preferably carried on the outer wall of the female pyramidal member is connected with the other end of the flexible member for winding up and paying out the flexible member in operation of the device.

U.S. Pat. No. 3,989,270, as issued on Nov. 2, 1976 to inventor Charles R. Henderson, covers a "Hitch Construction." Here, the system includes an extensible and retractable, split hitch construction that offers articulative versatility in aligning the hitch with the ball or other hitch connection of a towing vehicle. Accordingly, rather than requiring an exact alignment of the trailer tongue with the tractor ball, for example, the tractor is merely brought in proximity with the hitch connection. Thereafter, the tongue of the hitch is extended and pivoted as necessary to come into proper vertical alignment with the ball or other tractor connection. Means are provided in the hitch construction for the gradual application of brakes to the towed trailer where the same presses toward the tractor. Specifically, this patent covers an extensible and retractable, split hitch construction including, in combination, a drawbar constructed for mounting to a trailer; a movable tongue slidably secured to said drawbar for elongate extension and retraction, where the tongue has an elongate hollow interior and an outer extremity provided with a tractor connection; vertical pivot means intercoupling the tongue to the drawbar for enabling the horizontal pivotal displacement of the tongue relative to the drawbar, on opposites thereof, when the tongue is in an extended position; a first means for constraining the tongue to axial alignment with the drawbar when the tongue is in a retracted position relative to the drawbar; a second means for releasably securing the tongue to the drawbar in a retracted position and a third means intercoupling the tongue to the drawbar for selectively mechanically pulling the tongue toward a retracted position relative to the drawbar, where the third means features a flexible elongate connector, constrained within the hollow interior of the tongue and extending rearwardly thereof, and anchored to the drawbar, as well as a winch carried by the movable tongue and operatively engaging the flexible elongate connector.

Lastly, U.S. Pat. No. 6,428,030 issued on Aug. 6, 2002 to inventors Steven David Melesko and Charles Allen Winslow, covering a "Self-Centering Trailer Hitch." The self-centering trailer hitch features first and second telescopic arms, each of which have a first and second opposite ends. The first ends of the telescopic arms are pivotally mounted to a hitch hood coupler for coupling the first ends of the telescopic arms releasably to the hood of a trailer hitch. The second ends of the telescopic arms are adapted to be pivotally mounted to a rear end of a towing vehicle, mountable to the vehicle forward relative to a hitch ball mounted to the vehicle. The second ends of the telescopic arms, when mounted to the rear end of the vehicle, are disposed on laterally opposite sides of the hitch ball.

What is needed is a system and method for providing controlled flexibility of the vehicle-to-trailer coupling during coupling, uncoupling, and low-speed maneuvering, with automatic changeover to a rigid coupling at the earliest appropriate time and without any action required from the operator of the vehicle.

SUMMARY OF THE INVENTION

This invention provides a controlled-flexing trailer hitch system and method to facilitate vehicle-to-trailer attachment and maneuvering. This controlled-flexing trailer hitch system and method provides a flexible state during attachment, detachment, and low-speed maneuvering of a trailer, and automatic change to a fixed in-line state upon the in-line pulling of the trailer, by providing disengageable spring-return stiffening members and a flexible segmented towing member, where the spring-return stiffening members can be disengaged to allow flexible movement of the flexible towing member, and where, upon commencement of the in-line pulling of the trailer, the spring-return stiffening members engage to place the controlled-flexing trailer hitch into a fixed in-line state.

Four embodiments of the controlled-flexing trailer hitch are illustrated: a rod embodiment, a flap-segment embodiment, a sliding tube embodiment, and an easy-connect embodiment.

BRIEF DESCRIPTION OF DRAWINGS

Reference will now be made to the drawings, wherein like parts are designated by like numerals, and wherein.

DETAILED DESCRIPTION OF THE INVENTION

The controlled-flexing trailer hitch system and method of the invention provides improved to facilitation of vehicle-to-trailer coupling and uncoupling, and low-speed maneuvering of a trailer by changing to a flexible state during attachment, detachment, and low-speed maneuvering of a trailer, and changing to a fixed in-line state upon the in-line pulling of the trailer, automatically and without the need for any action by the vehicle operator. The controlled-flexing trailer hitch provides one or more disengageable spring-return stiffening members and a flexible segmented towing member. The spring-return stiffening members can be disengaged to allow flexible movement of the flexible towing member during coupling and uncoupling, and during the low-speed maneuvering associated with coupling or uncoupling the trailer. After coupling, when the vehicle begins to exert an in-line, direct pull against the trailer, the spring-return stiffening members engage again, and lock into place as a stiff, in-line towing link.

Four embodiments of the controlled-flexing trailer hitch are illustrated. The embodiments are a rod embodiment, a flap-segment embodiment, a sliding tube embodiment, and an easy-connect embodiment. Each embodiment provides different specific structures to perform as the disengageable spring-return stiffening member or members and as the flexible segmented towing member or members.

Figure 1:
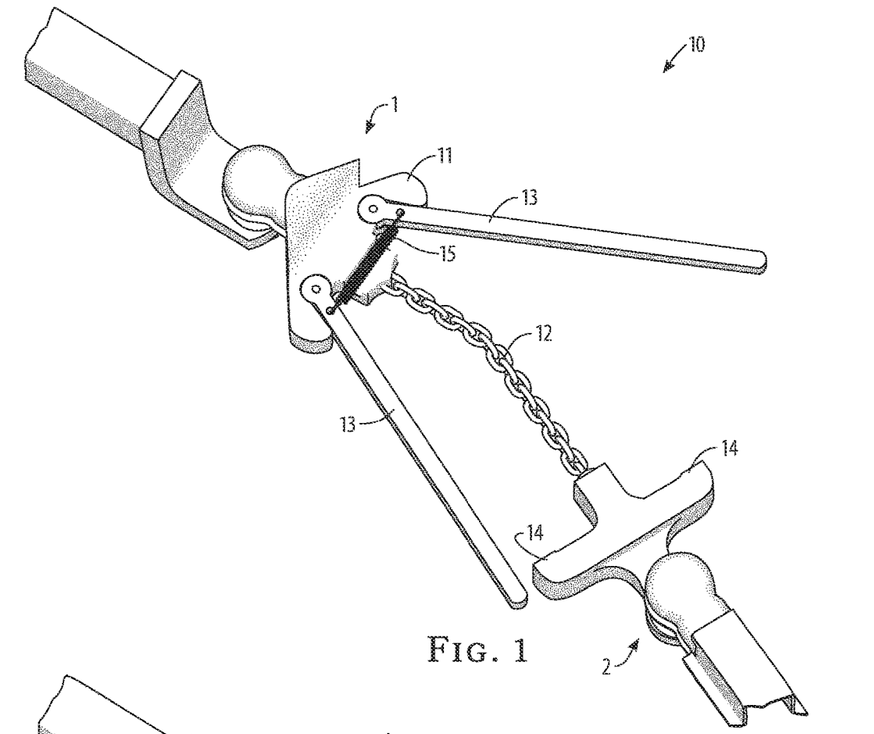
FIG. 1 is a perspective view of a rod embodiment of the controlled-flexing trailer hitch of the invention in a flexible state.
Figure 2:
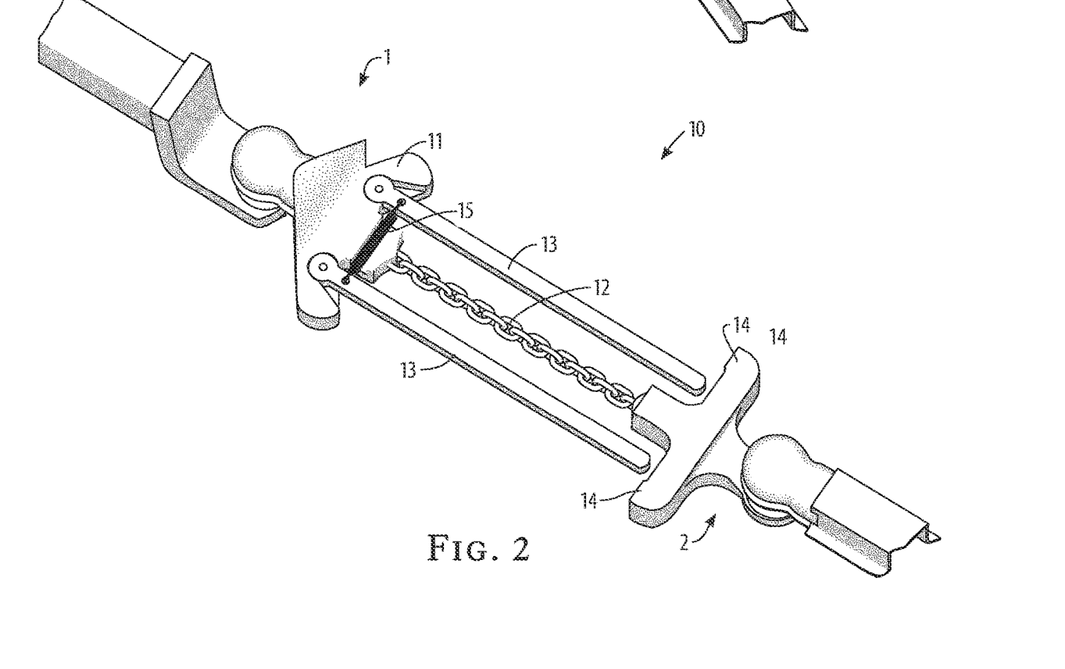
FIG. 2 is a perspective view of a rod embodiment of the controlled-flexing trailer hitch of the invention in a fixed state.

Referring to FIG. 1 and FIG. 2, a rod embodiment 10 of the controlled-flexing trailer hitch of the invention is shown in a flexible state and in a fixed in-line state, respectively. The controlled-flexing trailer hitch has a vehicle-end assembly 1 which incorporates a cup receiver meant to attach to the trailer-hitch ball of the towing vehicle, and has a trailer-end assembly 2 which incorporates a ball meant to attach to the trailer-hitch cup receiver of the trailer. All of the embodiments have this arrangement, which provides for use of the controlled-flexing trailer hitch in conjunction with standard trailer-hitch equipment.

The rod embodiment provides a chain 12 as the flexible segmented towing member. The chain 12 is mounted at its forward end upon the vehicle-end assembly 1. Two pivot rods 13 are provided, one on either side of the chain. Each pivot rod 13 pivots about a pivot base 11 incorporated into the vehicle-end assembly 1. The pivot is constrained as shown, between a position substantially parallel each to the other, and a diverging angle. The pivot rods 13 are connected by a spring 15 which acts to return the rods to a parallel position. The chain 12 is mounted at its rearward end to the trailer-end assembly 2, which incorporates a rod-capture structure 14. The rod-capture structure has lobes, as shown, with a cup or notch on the inside of each lobe. As shown, the relationship of the structures is such that when a pivot rod 13 is pivoted outward, it will allow the trailer-end assembly 2 to move into positions where the axis of the trailer-end assembly 2 is at an acute angle with the axis of the vehicle-end assembly 1, with the flexible segmented towing member chain 12 accommodating the bend. When bent like this, even though the spring 15 is exerting a pull on the pivot rod 13, the free end of the pivot rod 13 will be blocked from returning to parallel by the exterior portion of the rod-capture structure 14, and the angular or bent orientation can continue.

After the trailer has been coupled and the initial low-speed maneuvering is finished, the vehicle will begin pulling the trailer such that the force is in-line and the axes of the vehicle-end assembly 1 and the trailer-end assembly 2 are either co-axial or parallel. In such an in-line orientation, the movement of the pivot rods 13 are not blocked by the lobes of the rod-capture structure 14, and the pivot rods 13 return to a parallel orientation by the force of the spring 15. After the pivot rods 13 return to a parallel orientation, any tendency of the overall structure to bend or flex is countered by the capture of the pivots rods within the rod-capture structure, putting the controlled-flexing trailer hitch into a stiff, non-flexible state needed for safe towing of the trailer.

Figure 3:
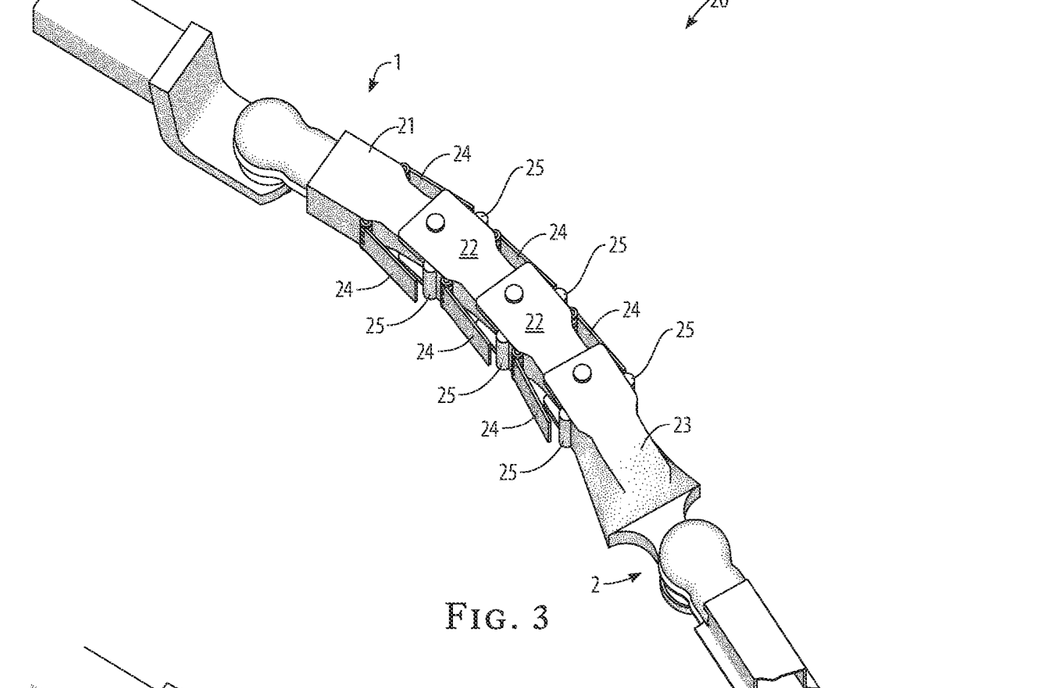
FIG. 3 is a perspective view of a flap-segment embodiment of the controlled-flexing trailer hitch of the invention in a flexible state.
Figure 4:
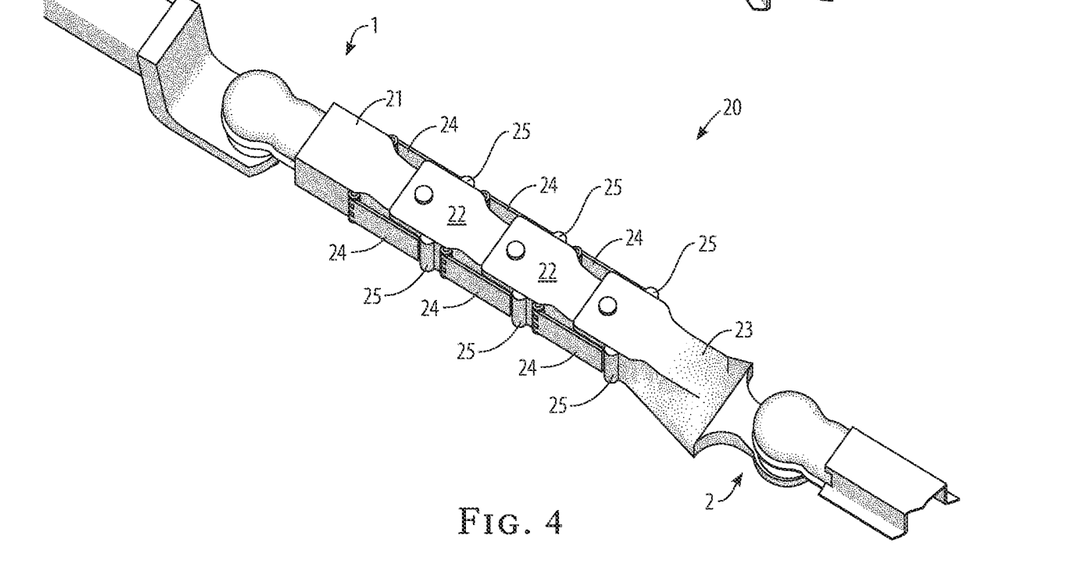
FIG. 4 is a perspective view of a flap-segment embodiment of the controlled-flexing trailer hitch of the invention in a fixed state.

Referring to FIG. 3 and FIG. 4, a flap-segment embodiment 20 of the controlled-flexing trailer hitch of the invention is shown in a flexible state and in a fixed in-line state, respectively. This embodiment also has a vehicle-end assembly 1 and a trailer-end assembly 2 which allow attachment to standard trailer-hitch equipment.

The flap-segment embodiment provides pivotally linked segments as the flexible segmented towing member. A first end segment 21 is mounted to the vehicle-end assembly 1, one or more middle segments 22 are mounted behind, and a second end segment 23 is mounted to the trailer-end assembly 2. The first end segment 21 and the middle segments 22 have spring-return flaps 24 pivotally mounted on them as shown, one on each side, and pivoting between positions flush or parallel with the sides, and positions at an angle to the sides. The spring force urges the spring-return flap into a flush or parallel position. The middle segments 22 and the second end segment 23 have bumpers 25 incorporated into the segment sides, as shown. The relationship of the structures is such that when a spring-return flap 24 is pivoted outward, it will allow the trailer-end assembly 2 to move into positions where the axis of the trailer-end assembly 2 is at an acute angle with the axis of the vehicle-end assembly 1, with the flexible segmented towing member end and middle segments 21, 22, 23 accommodating the bend. When bent like this, even though the spring-return flap 24 is being pulled back into position, the adjacent bumper 25 will block the flap from returning to parallel, and the angular or bent orientation can continue.

After the trailer has been coupled and the initial low-speed maneuvering is finished, the vehicle will begin pulling the trailer such that the force is in-line and the axes of the vehicle-end assembly 1 and the trailer-end assembly 2 are either co-axial or parallel. In such an in-line orientation, the movement of the spring-return flaps 24 are not blocked by the bumpers 25, and the flaps return to a parallel orientation. After the spring-return flaps 24 return to a parallel orientation, any tendency of the overall structure to bend or flex is countered by the free end of the spring-return flaps 24 being blocked by the bumpers 25, putting the controlled-flexing trailer hitch into a stiff, non-flexible state needed for safe towing of the trailer.

Figure 5:
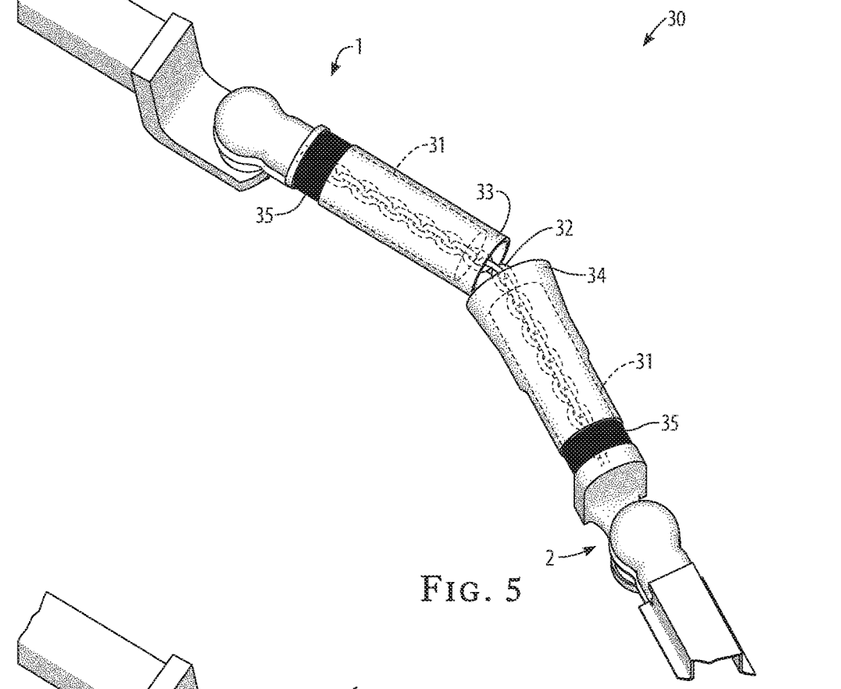
FIG. 5 is a perspective view of a sliding tube embodiment of the controlled-flexing trailer hitch of the invention in a flexible state.
Figure 6:
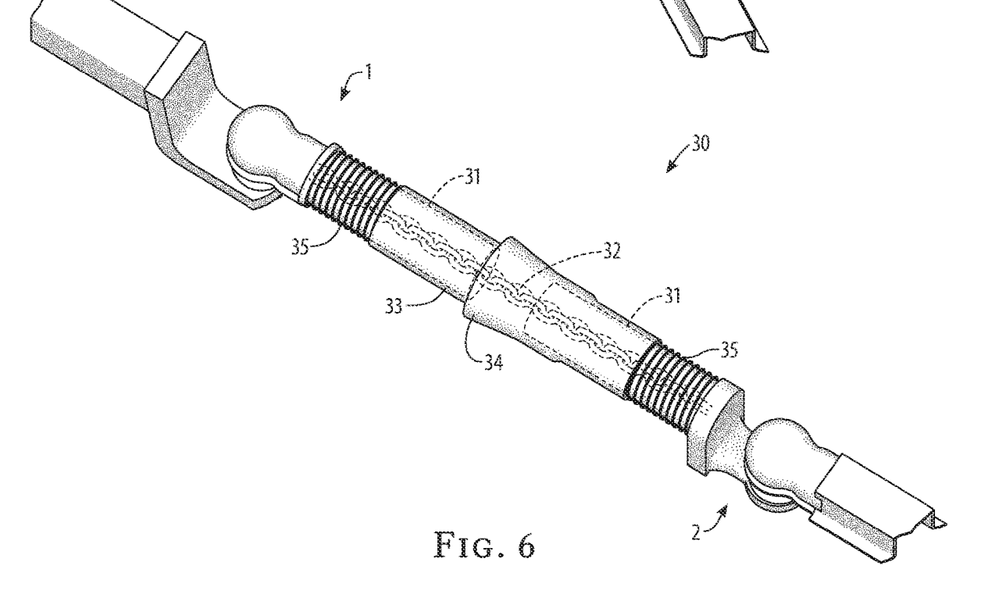
FIG. 6 is a perspective view of a sliding tube embodiment of the controlled-flexing trailer hitch of the invention in a fixed state.

Referring to FIG. 5 and FIG. 6, a sliding tube embodiment 30 of the controlled-flexing trailer hitch of the invention is shown in a flexible state and in a fixed in-line state, respectively. This embodiment also has a vehicle-end assembly 1 and a trailer-end assembly 2 which allow attachment to standard trailer-hitch equipment.

The sliding tube embodiment provides a chain 32 as the flexible segmented towing member. The chain 32 is mounted at its forward end upon the vehicle-end assembly 1, and at its rearward end upon the trailer-end assembly 2. Two segments of inner tube 31 are provided, one mounted to the vehicle-end assembly 1, and the other mounted to the trailer-end assembly 2. The inner tubes 31 surround the chain 32. The chain 32 is longer than the length of the two inner tubes 31 put together, such that when the chain 32 is fully extended, there is a gap between the free ends of the segments of inner tube 31, as shown. Each segment of inner tube 31 has a sliding-tube segment mounted around it. The sliding-tube segments are sized in relation to each other such that a smaller sliding-tube segment 33 can be slid into and accommodated by a portion of the larger sliding-tube segment 34. Preferably, the end of the larger sliding-tube segment can be flared or expanded so that the smaller sliding-tube segment 33 can more easily slide into it. Two springs 35 are provided, outside each inner tube 31 at the end mounted to either the vehicle-end assembly 1 or the trailer-end assembly 2. One spring 35 pushes the smaller sliding-tube segment 33 and the other spring 35 pushes the larger sliding-tube segment 34. The springs' forces push the sliding-tube segments 33, 34 together, and therefore into a position where the smaller sliding-tube segment 33 slides into the larger sliding-tube segment 34.

As shown, the relationship of the structures is such that when the smaller sliding-tube segment 33 and the larger sliding-tube segment 34 are pushed away from each other, it will allow the trailer-end assembly 2 to move into positions where the axis of the trailer-end assembly 2 is at an acute angle with the axis of the vehicle-end assembly 1, with the flexible segmented towing member chain 32 accommodating the bend in the area of the gap between the two inner tube 31 segments. When bent like this, even though the springs 35 are exerting force on the smaller and larger sliding tube segments, the angle between the sliding tube segments prevent the sliding of one into the other, and the angular or bent orientation can continue.

After the trailer has been coupled and the initial low-speed maneuvering is finished, the vehicle will begin pulling the trailer such that the force is in-line and the axes of the vehicle-end assembly 1 and the trailer-end assembly 2 are either co-axial or parallel. In such an in-line orientation, the smaller sliding-tube segment 33 will slip into the larger sliding tube segment 34, under the force of the springs 35, and any tendency of the overall structure to bend or flex is countered by the telescoped tubes, putting the controlled-flexing trailer hitch into a stiff, non-flexible state needed for safe towing of the trailer.

Figure 7:
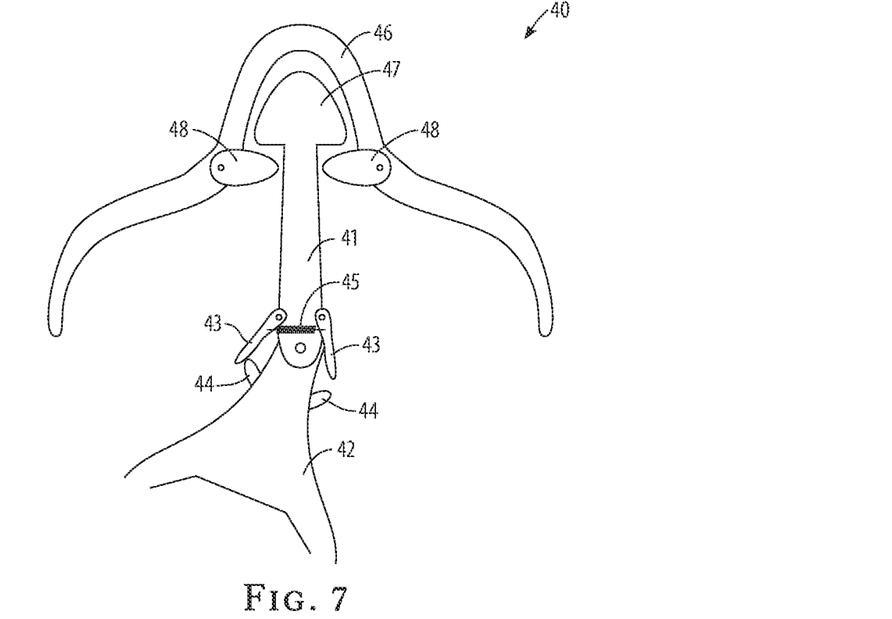
FIG. 7 is a plan view of an easy-connect embodiment of the controlled-flexing trailer hitch of the invention in a flexible state.
Figure 8:
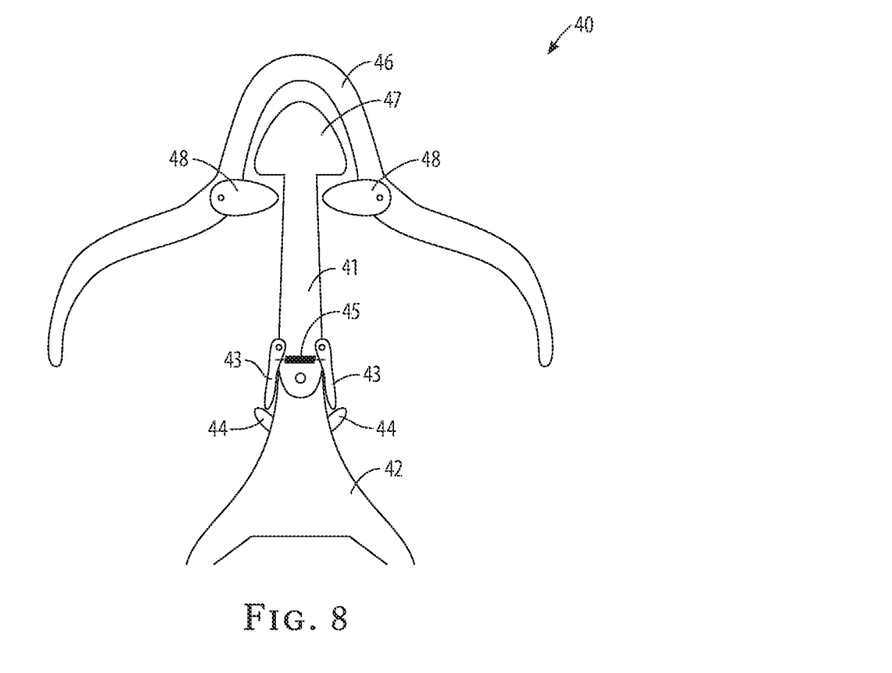
FIG. 8 is a plan view of an easy-connect embodiment of the controlled-flexing trailer hitch of the invention in a fixed state.

Referring to FIG. 7 and FIG. 8, an easy-connect embodiment 40 of the controlled-flexing trailer hitch of the invention is shown in a flexible state and in a fixed in-line state. In addition to the controlled flexibility provided by all of the embodiments of this invention, this easy-connect embodiment 40 provides an easier coupling of the vehicle to the trailer, by substituting or supplementing the standard trailer-hitch equipment with a system which guides the connector from the trailer into the connector from the vehicle.

The easy-connect embodiment provides a pivotally connected first member 41 and second member 42 as the flexible segmented towing member. On the first member 41, near the pivot connection between the first member 41 and the second member 42, are provided pivot members 43, connected by a spring 45, which function similarly to the pivot rods 13 and spring 15 of the rod embodiment treated above. On the second member 42, also near the pivot connection between the first member 41 and the second member 42, are provided bumper members 44, which function similarly to the bumpers 25 of the flap-segment embodiment treated above.

As shown, the relationship of the structures is such that when a pivot member 43 is pivoted outward, it will allow the second member 42, attached to the trailer, to move into positions where the axis of the second member 42 is at an acute angle with the axis of the first member 41. When bent like this, even though the spring 145 is exerting a pull on the pivot exterior portion of the bumper member 44, and the angular or bent orientation can continue.

After the trailer has been coupled and the initial low-speed maneuvering is finished, the vehicle will begin pulling the trailer such that the force is in-line and the axes of the first member 41 and second member 42 are either co-axial or parallel. In such an in-line orientation, the movement of the pivot members 43 are not blocked by the bumper members 44, and the pivot members 43 return to a parallel orientation by the force of the spring 45. After the pivot members 43 return to a parallel orientation, any tendency of the overall structure to bend or flex is countered by the capture of the pivot members 43 within the bumper members 44, putting the controlled-flexing trailer hitch into a stiff, non-flexible state needed for safe towing of the trailer.

The easy-capture aspect of this embodiment is achieved by providing a socket member 46 ultimately mounted to the vehicle, and a plug member 47 ultimately mounted to the trailer. The plug member 47 is provided with a tapered and barbed shape which facilitates entry into the socket member 46 but resists retraction. The socket member 46 is provided with limited-pivot stops 48 that pivot aside to allow entry of the plug member 47 into the socket member 46, but which lock and serve to capture the plug member 47 against exit from the socket member 46.

In use, the vehicle can be backed up against the trailer in a somewhat imprecise manner, and the plug member 47 will be guided into secure connection with the socket member 46, forming a secure coupling of the vehicle to the trailer.

The front end of the chain may be secured to a winch or recoil system on the rear end of the vehicle to pull the chain forward and move the units next to each other, thereby converting the trailer hitch system from a flexible to a rigid state.

Many other changes and modifications can be made in the system and method of the present invention without departing from the spirit thereof. I therefore pray that my rights to the present invention be limited only by the scope of the appended claims.

I claim:

1. A controlled-flexing trailer hitch system to facilitate vehicle-to-trailer attachment and maneuvering, the controlled-flexing trailer hitch comprising:
   (i) a vehicle-end assembly adapted to couple and uncouple with the standard trailer-towing equipment on the vehicle, having an in-line towing axis;
   (ii) a trailer-end assembly adapted to couple and uncouple with the standard trailer-towing equipment on the trailer, having an in-line towing axis;
   (iii) at least one flexible segmented towing member connecting said vehicle-end assembly and said trailer-end assembly, where said controlled-flexing trailer hitch is in a rod embodiment, and where said flexible segmented towing member comprises a chain; and
   (iv) at least one spring-return stiffening member arrayed substantially along said flexible segmented towing member, adapted to allow flexing of said flexible segmented towing member when in a flexing position, and to prevent flexing of said flexible segmented towing member when in a fixed in-line position;
   where, in use, said spring-return stiffening member is placed into a flexing position, with the towing axes of said vehicle-end assembly and said trailer-end assembly at an angle one to the other, to allow flexing of said flexible segmented towing member during attachment and maneuvering; and where, in use, upon the occurrence of an in-line pull from the vehicle to the trailer, with the towing axes of said vehicle-end assembly and said trailer-end assembly coaxial or parallel, said spring-return stiffening member is placed into a fixed in-line position, thereby stiffening and fixing said controlled-flexing trailer hitch into an in-line orientation, without any required action by the vehicle operator.

2. The controlled-flexing trailer hitch of claim 1, in a rod embodiment, where said spring-return stiffening member further comprises two pivot rods pulled into parallel orientation by a spring.

3. The controlled-flexing trailer hitch of claim 1, in a rod embodiment, where said vehicle-end assembly further comprises a pivot base.

4. The controlled-flexing trailer hitch of claim 1, in a rod embodiment, where said trailer-end assembly further comprises a rod-capture structure.

5. A controlled-flexing trailer hitch system to facilitate vehicle-to-trailer attachment and maneuvering, the controlled-flexing trailer hitch comprising:
   (i) a vehicle-end assembly adapted to couple and uncouple with the standard trailer-towing equipment on the vehicle, having an in-line towing axis;
   (ii) a trailer-end assembly adapted to couple and uncouple with the standard trailer-towing equipment on the trailer, having an in-line towing axis;
   (iii) at least one flexible segmented towing member connecting said vehicle-end assembly and said trailer-end assembly;
   (iv) at least one spring-return stiffening member arrayed substantially along said flexible segmented towing member, adapted to allow flexing of said flexible segmented towing member when in a flexing position, and to prevent flexing of said flexible segmented towing member when in a fixed in-line position; where in a sliding tube embodiment said spring-return stiffening member further comprises two segments of inner tube, a smaller sliding-tube segment, a larger sliding-tube segment, and two springs;
   where, in use, said spring-return stiffening member is placed into a flexing position, with the towing axes of said vehicle-end assembly and said trailer-end assembly at an angle one to the other, to allow flexing of said flexible segmented towing member during attachment and maneuvering; and where, in use, upon the occurrence of an in-line pull from the vehicle to the trailer, with the towing axes of said vehicle-end assembly and said trailer-end assembly coaxial or parallel, said spring-return stiffening member is placed into a fixed in-line position, thereby stiffening and fixing said controlled-flexing trailer hitch into an in-line orientation, without any required action by the vehicle operator.

6. The controlled-flexing trailer hitch of claim 5, where in a sliding tube embodiment, said flexible segmented towing member further comprises a chain.

7. A controlled-flexing trailer hitch method to facilitate vehicle-to-trailer attachment and maneuvering, comprising:
   (i) providing a controlled-flexing trailer hitch system, comprising:
   (ii) a vehicle-end assembly adapted to couple and uncouple with the standard trailer-towing equipment on the vehicle, having an in-line towing axis;
       (a) a trailer-end assembly adapted to couple and uncouple with the standard trailer-towing equipment on the trailer, having an in-line towing axis;
       (b) at least one flexible segmented towing member connecting said vehicle-end assembly and said trailer-end assembly; where said controlled-flexing trailer hitch is in a rod embodiment, and where said flexible segmented towing member further comprises a chain; and
       (c) at least one spring-return stiffening member arrayed substantially along said flexible segmented towing member, adapted to allow flexing of said flexible segmented towing member when in a flexing position, and to prevent flexing of said flexible segmented towing member when in a fixed in-line position; and
   (ii) using said controlled-flexing trailer hitch system where, in use, said spring-return stiffening member is placed into a flexing position, with the towing axes of said vehicle-end assembly and said trailer-end assembly at an angle one to the other, to allow flexing of said flexible segmented towing member during attachment and maneuvering;
   and where, in use, upon the occurrence of an in-line pull from the vehicle to the trailer, with the towing axes of said vehicle-end assembly and said trailer-end assembly co-axial or parallel, said spring-return stiffening member is placed into a fixed in-line position, thereby stiffening and fixing said controlled-flexing trailer hitch into an in-line orientation, without any required action by the vehicle operator.

\* \* \* \* \*